(12) United States Patent
Suzuki

(10) Patent No.: US 7,751,178 B2
(45) Date of Patent: *Jul. 6, 2010

(54) DIELECTRIC CERAMIC AND MULTILAYER CERAMIC CAPACITOR USING THE SAME

(75) Inventor: Shoichiro Suzuki, Yasu (JP)

(73) Assignee: Murata Manufacturing Co., Ltd., Kyoto-fu (JP)

(*) Notice: Subject to any disclaimer, the term of this patent is extended or adjusted under 35 U.S.C. 154(b) by 0 days.

This patent is subject to a terminal disclaimer.

(21) Appl. No.: 12/463,682

(22) Filed: May 11, 2009

(65) Prior Publication Data

US 2009/0207551 A1 Aug. 20, 2009

Related U.S. Application Data

(63) Continuation of application No. PCT/JP2007/071955, filed on Nov. 13, 2007.

(30) Foreign Application Priority Data

Dec. 5, 2006 (JP) .............................. 2006-328545

(51) Int. Cl.
*H01G 4/06* (2006.01)
(52) U.S. Cl. .................... 361/321.4; 361/311; 501/137
(58) Field of Classification Search ... 361/321.1–321.5, 361/311; 501/135–139
See application file for complete search history.

(56) References Cited

U.S. PATENT DOCUMENTS 7,595,975 B2 * 9/2009 Suzuki et al. ............ 361/321.4

FOREIGN PATENT DOCUMENTS

| JP | 340962 | 2/1991 |
| JP | 2002029835 A | 1/2002 |
| JP | 2002274935 A | 9/2002 |
| JP | 2006298680 A | 11/2006 |
| WO | WO-2005075377 A1 | 8/2005 |

OTHER PUBLICATIONS

International Search Report for PCT/JP2007/071955 dated Feb. 19, 2008.
Kiyoshi Okazaki, "Ceramic Engineering for Dielectrics (Third Edition)", pp. 281-283, published by Gakken-sha.

* cited by examiner

*Primary Examiner*—Eric Thomas
(74) *Attorney, Agent, or Firm*—Dickstein Shapiro LLP

(57) ABSTRACT

A dielectric ceramic is provided which is can be stably used for a multilayer ceramic capacitor even at a high temperature of approximately 175° C. The dielectric ceramic includes a perovskite type compound represented by the composition formula $(Ba_{1-x-y}Ca_xSn_y)_m(Ti_{1-z}Zr_z)O_3$ (where x, y, z, and m satisfy $0 \leq x \leq 0.20$, $0.02 \leq y \leq 0.20$, $0 \leq z \leq 0.05$, and $0.990 \leq m \leq 1.015$, respectively) as a primary component; and RE as an accessory component (where RE is at least one selected from the group consisting of Y, La, Ce, Pr, Nd, Sm, Eu, Gd, Tb, Dy, Ho, Er, Tm, Yb, and Lu), wherein 0.5 to 20 molar parts of RE is contained with respect to 100 molar parts of the primary component.

20 Claims, 1 Drawing Sheet

DIELECTRIC CERAMIC AND MULTILAYER CERAMIC CAPACITOR USING THE SAME

This is a continuation of application Serial No. PCT/JP2007/071955, filed Nov. 13, 2007.

TECHNICAL FIELD

The present invention generally relates to a dielectric ceramic and a multilayer ceramic capacitor using the same, and more particularly relates to a dielectric ceramic which has a high Curie temperature and which can be stably used at a high temperature of approximately 175° C. and a multilayer ceramic capacitor using the above dielectric ceramic.

BACKGROUND ART

A multilayer ceramic capacitor, which is a primary application of the present invention, is generally manufactured as described below.

First, ceramic green sheets are prepared which include a dielectric ceramic raw material and whose surfaces are provided with a conductive material to be formed into internal electrodes each having a desired pattern. As the dielectric ceramic, for example, a dielectric ceramic including a $BaTiO_3$-based compound as a primary component may be used.

Next, a plurality of ceramic green sheets including the above-described ceramic green sheets each provided with the conductive material are laminated to each other and are thermal-bonded, so that an integrated green laminate is formed.

Subsequently, by firing this green laminate, a sintered ceramic laminate is obtained. Inside this ceramic laminate, internal electrodes composed of the above-described conductive material have been formed.

Next, external electrodes are formed on outer surfaces of the ceramic laminate so as to be electrically connected to the respective internal electrodes. The external electrodes are formed, for example, by applying a conductive paste including a conductive metal powder and a glass frit to the outer surfaces of the laminate, followed by firing. By the process described above, a multilayer ceramic capacitor is formed.

As a dielectric ceramic suitable for a multilayer ceramic capacitor, for example, a barium titanium-based ceramic ($BaTiO_3$) may be mentioned. For example, in Japanese Unexamined Patent Application Publication No. 03-040962 (hereinafter referred to as "Patent Document 1"), a dielectric ceramic including barium titanate as a primary component and $SnO_2$, $Bi_2O_3$, $MgO$, $SiO_2$, $La_2O_3$, $Sm_2O_3$, and $Nd_2O_3$ as accessory components has been disclosed.

However, since the dielectric ceramic disclosed in Patent Document 1 has a low Curie temperature of −20 to 15° C., the dielectric constant thereof rapidly increases as the temperature increases, and there has been a problem in that the above dielectric ceramic cannot be used in a high temperature region. In particular, since a multilayer ceramic capacitor have been recently used for automobile applications, it is desired that the multilayer ceramic capacitor be stably useable at a high temperature of approximately 175° C. Accordingly, the Curie temperature is preferably at least 130° C. or more.

Accordingly, a dielectric ceramic composition has been disclosed in International Publication WO 2005/075377 Pamphlet (hereinafter referred to as "Patent Document 2") which includes a perovskite type compound represented by the composition formula: $(Ba,Sn)TiO_3$ as a primary component and which has a Curie temperature of 130° C. or more.

In the dielectric ceramic composition disclosed in Patent Document 2, the Curie temperature of the ceramic is increased to 130° C. or more since Sn is located in the Ba site as a divalent cationic element.

In general, Sn is usually located in the Ti site in a barium titanate-based ceramic since tetravalent cationic Sn is placed in a stable state. When the Ti of barium titanate is replaced with Sn, as disclosed by K. Okazaki, "Ceramic Dielectric Technologies" 3rd edition, pp. 281 to 283, published by Gakken-sha (hereinafter referred to as "Non-Patent Document 1"), the Curie temperature of 120° C., which is obtained when Ti is not replaced with Sn, considerably decreases to room temperature or less. The reason the dielectric ceramic disclosed in Patent Document 1 has a low Curie temperature is also believed that Sn is located in the Ti site as a tetravalent cationic element.

Patent Document 1: Japanese Unexamined Patent Application Publication No. 3-040962

Patent Document 2: International Publication WO 2005/075377 Pamphlet

Non-Patent document 1: K. Okazaki, "Ceramic Dielectric Technologies" 3rd edition, pp. 281 to 283, published by Gakken-sha

DISCLOSURE OF INVENTION

Problems to be Solved by the Invention

According to Patent Document 2, a high Curie temperature is obtained since Sn is located in the Ba site as a divalent cationic element. However, when the temperature is high, such as approximately 175° C., it becomes difficult for the static capacitance-temperature characteristics to satisfy X9R (in which the change in static capacitance in the range of −55 to 175° C. is set within ±15% with respect to a static capacitance at 25° C. which is used as a reference).

In consideration of the problem described above, the present invention has been conceived, and an object of the present invention is to provide a dielectric ceramic which has a high Curie temperature, which exhibits stable properties even at a high temperature of approximately 175° C., and which satisfies the X9R characteristics, and a multilayer ceramic capacitor using the above dielectric ceramic.

Means for Solving the Problems

That is, the dielectric ceramic of the present invention includes a perovskite type compound represented by the composition formula $(Ba_{1-x-y}Ca_xSn_y)_m(Ti_{1-z}Zr_z)O_3$ (where x, y, z, and m satisfy $0 \leq x \leq 0.20$, $0.02 \leq y \leq 0.20$, $0 \leq z \leq 0.05$, and $0.990 \leq m \leq 1.015$, respectively) as a primary component; and RE as an accessory component (where RE is at least one selected from the group consisting of Y, La, Ce, Pr, Nd, Sm, Eu, Gd, Tb, Dy, Ho, Er, Tm, Yb, and Lu), and in the above dielectric ceramic, 0.5 to 20 molar parts of RE is contained with respect to 100 molar parts of the primary component.

In addition, the content x of Ca in the primary component preferably satisfies: $0.02 \leq x \leq 0.20$, in the dielectric ceramic of the present invention.

In addition, the Curie temperature thereof is preferably 130° C. or more in the dielectric ceramic of the present invention.

Furthermore, the dielectric ceramic of the present invention preferably further includes 0.02 to 1 molar part of at least one element selected from the group consisting of Mn and V as an accessory component with respect to 100 molar parts of the primary component.

In addition, the dielectric ceramic of the present invention preferably further includes 0.3 to 4 molar parts of at least one element selected from the group consisting of Mg, Ni, and Zn as an accessory component with respect to 100 molar parts of the primary component.

Furthermore, the dielectric ceramic of the present invention preferably further includes 0.2 to 5 molar parts of Si as an accessory component with respect to 100 molar parts of the primary component.

The present invention is also directed to a multilayer ceramic capacitor using one of the dielectric ceramics described above.

That is, a multilayer ceramic capacitor of the present invention includes a ceramic laminate which has a plurality of ceramic layers laminated to each other and a plurality of layered internal electrodes formed along interfaces between the ceramic layers; and a plurality of external electrodes electrically connected to the internal electrodes exposed to surfaces of the ceramic laminate. In the above multilayer ceramic capacitor, the ceramic layers include one of the dielectric ceramics described above.

In addition, the internal electrodes preferably include Ni as a primary component in the multilayer ceramic capacitor of the present invention.

Advantages

In the dielectric ceramic including a barium titanate-based compound as a primary component according to the present invention, since the Ba site is partly replaced with divalent cationic Sn, the Curie temperature is increased to 130° C. or more. It is noteworthy that since the dielectric ceramic of the present invention further includes a rare earth element RE as an accessory component, the curve of change in dielectric constant with temperature is smooth to a high temperature of approximately 175° C., and as a result, the static capacitance-temperature characteristics can satisfy the X9R.

In addition, when the Ba site is further partly replaced with Ca in the dielectric ceramic of the present invention, even when the firing reducing atmosphere is suppressed to an oxygen partial pressure of approximately $10^{-10}$ to $10^{-12}$ MPa, Sn is sufficiently likely to be located in the Ba site as a divalent cationic element. Accordingly, since the degree of freedom of firing conditions is increased, the dielectric properties can be easily changed by adjusting the firing conditions.

In addition, when the dielectric ceramic of the present invention includes as an accessory component, at least one of Mn and V, at least one of Mg, Ni, and Zn, or Si, and when the dielectric ceramic of the present invention is used for a multilayer ceramic capacitor in which internal electrodes are primarily composed of Ni, superior insulating resistance and reliability can be ensured.

As apparent from the description above, when the dielectric ceramic of the present invention is used, a multilayer ceramic capacitor can be obtained which is suitably used at a high temperature, for example, in automobile applications.

REFERENCE NUMERALS

Figure 1:
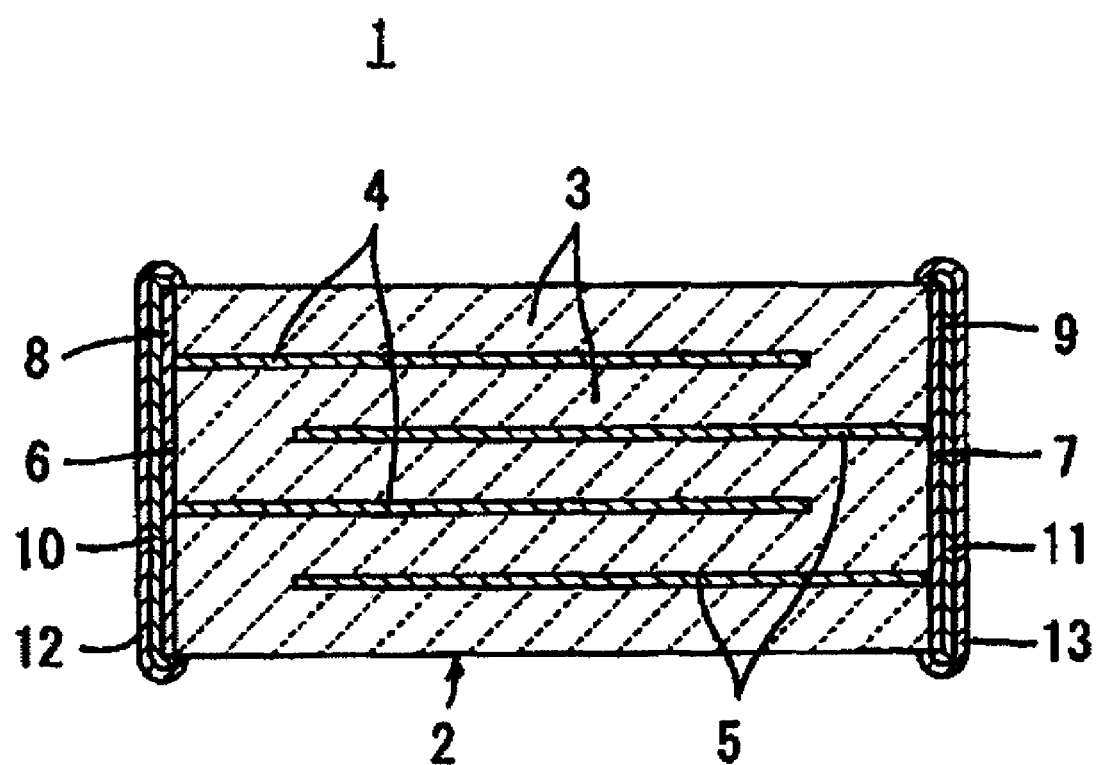
FIG. 1 is a cross-sectional view schematically showing a multilayer ceramic capacitor according to one embodiment of the present invention.

1: multilayer ceramic capacitor, 2: ceramic laminate, 3: dielectric ceramic layer, 4, 5: internal electrode, 8, 9: external electrode, 10, 11: first plating layer, 12, 13: second plating layer

BEST MODES FOR CARRYING OUT THE INVENTION

First, a multilayer ceramic capacitor, which is a primary application of a dielectric ceramic of the present invention, will be described. FIG. 1 is a cross-sectional view showing the structure of a general multilayer ceramic capacitor.

As shown in FIG. 1, a multilayer ceramic capacitor 1 includes a rectangular parallelepiped ceramic laminate 2. The ceramic laminate 2 includes a plurality of dielectric ceramic layers 3 laminated to each other and a plurality of internal electrodes 4 and 5 formed along interfaces between the dielectric ceramic layers 3. The internal electrodes 4 and 5 are formed to extend to outer surfaces of the ceramic laminate 2. The internal electrodes 4 extending to one end surface 6 of the ceramic laminate 2 and the internal electrodes 5 extending to another end surface 7 are alternately disposed so as to obtain static capacitance in the ceramic laminate 2 through the dielectric ceramic layers 3.

As a primary component of a conductive material of the internal electrodes 4 and 5, nickel, copper, or silver may be used; however, in order to decrease cost, nickel is preferably used.

In order to extract the static capacitance described above, external electrodes 8 and 9 are formed on the outer surfaces, that is, on the end surfaces 6 and 7, of the ceramic laminate 2 so as to be electrically connected to the respective internal electrodes 4 and 5. As a conductive material contained in the external electrodes 8 and 9, the same conductive material as that for the internal electrodes 4 and 5 may be used, and in addition, for example, silver, palladium, or a silver-palladium alloy may also be used. The external electrodes 8 and 9 are formed by applying a conductive paste which is obtained by adding a glass frit to a powder of the above metal or alloy, followed by firing.

In addition, whenever necessary, first plating layers 10 and 11 composed of nickel, copper, or the like are formed on the external electrodes 8 and 9, and second plating layers 12 and 13 composed of solder, tin, or the like are formed on the first plating layers 10 and 11, respectively.

Next, a dielectric ceramic of the present invention will be described in detail.

In the composition of the dielectric ceramic of the present invention, the primary component is a perovskite type compound represented by the composition formula $(Ba_{1-x-y}Ca_xSn_y)_m(Ti_{1-z}Zr_z)O_3$, and the above x, y, z, and m satisfy $0 \leq x \leq 0.20$, $0.02 \leq y \leq 0.20$, $0 \leq z \leq 0.05$, and $0.990 \leq m \leq 1.015$, respectively.

In the this dielectric ceramic, the Sn is primarily located in the Ba site as a divalent cationic element and is hardly located in the Ti site. Although the Curie temperature of barium titanate is approximately 120° C., when the amount of a Sn substituent in the Ba site is increased, the Curie temperature increases, and when the substituent amount y is 0.02 or more, the Curie temperature increases to 130° C. or more. In addition, Ca is also located in the Ba site as a divalent cationic element. However, since the position of Ca has no significant influence on the change in Curie temperature, as long as the object of the present invention is not damaged, a small amount of Ca may be present in grain boundaries, or Ca may be located in the Ti site.

Furthermore, Ti may be partly replaced with Zr. However, when the substituent amount z is more than 0.05, the Curie temperature considerably decreases, and hence it is against the object of the present invention. A smaller substituent amount z is more preferable and an amount z of 0.01 or less is further preferable.

When the molar ratio m of the Ba site to the Ti site is in the range of 0.990 to 1.015, stable sintering properties and insulating properties of the dielectric ceramic can be maintained.

In addition, it is noteworthy that the dielectric ceramic of the present invention includes a rare earth element RE as an accessory component. When 0.5 molar parts or more of RE is contained with respect to 100 molar parts of the primary component, the curve of change in dielectric constant with temperature is smooth, and as a result, the static capacitance-temperature characteristics can satisfy the X9R characteristics. Although the reason for this has not been clearly understood yet, it is estimated that since the lattice volume is changed when Sn is solid-solved in the Ba site, and since the rare earth element RE is further added, a stress is applied to the lattice in a direction to enhance the ferroelectric property, that is, the tetragonal characteristics. On the other hand, when Sn is not present, or when Sn is located in the Ti site, the effect described above cannot be obtained. In addition, in order to maintain the dielectric constant high, the upper limit content of RE is preferably 20 molar parts.

In addition, use Ca in the present invention has an effect of promoting solid-solution of Sn in the Ba site. When the oxygen partial pressure during firing is approximately $10^{-10}$ MPa or less, Sn is likely to be solid-solved in the Ba site. Since the oxygen partial pressure in firing can be set relatively high, the degree of freedom of material design and element design can be increased. These effects can be realized when the substituent amount x is 0.02 or more. In order to ensure uniform solid solution of Ca, the upper limit of x is preferably 0.20.

In addition, the dielectric ceramic of the present invention preferably has a Curie temperature of 130° C. or more. In the dielectric ceramic of the present invention, when a Curie temperature of 130° C. or more is confirmed, it is understood that Sn is located in the Ba site. As also disclosed in the above Non-Patent Document 1, when Sn is located in the Ti site, the Curie temperature considerably decreases from 120° C.

In addition, a high Curie temperature can be advantageously obtained in the dielectric ceramic of the present invention, since the Ba site is partly replaced with Sn; however, it is not preferable that many components decreasing the Curie temperature are present. When a component decreasing the Curie temperature is added, in order to compensate for that, for example, the amount of the Sn substituent in the Ba site is preferably increased.

On the other hand, as an element increasing the Curie temperature of barium titanate as well as Sn, Pb and Bi may be mentioned. However, since Pb and Bi have a very poor reduction resistance, it is very difficult to use them as a ceramic component of a multilayer ceramic capacitor.

As described above, when a Curie temperature of 130° C. or more is confirmed in the dielectric ceramic of the present invention, it is practically verified that Sn is present in the Ba site as a divalent cationic element.

In addition, the presence of Sn in the Ba site as a divalent cationic element can also be confirmed by XANES (X-ray Absorption Near Edge Structure) which is one type of x-ray absorption spectroscopic method. That is, an X-ray absorption edge corresponding to excitation energy of a K shell electron of Sn is specified, and this energy value indicating this X-ray absorption edge is compared with reference values of Sn ions, such as $Sn^{2+}$ and $Sn^{4+}$, so that the valence number of Sn in a dielectric ceramic can be obtained.

In order to improve measurement accuracy and sensitivity of this XANES measurement, high intensity of incident x rays and high wavelength continuity are required. Hence, radiation light is preferably used as a light source of incident x rays.

Furthermore, the dielectric ceramic of the present invention may include various accessory components besides the rare earth element RE. Recently, a decrease in the thickness of a ceramic layer has been actively pursued in order to decrease the size of a multilayer ceramic capacitor using internal electrodes primarily composed of Ni. Hence, in order to obtain sufficient insulating resistance and reliability in a thin multilayer ceramic capacitor obtained by firing in a reducing atmosphere, the dielectric ceramic preferably includes various accessory components.

For example, when the dielectric ceramic of the present invention includes at least one of Mn and V as an accessory component, a sufficient insulating resistance can be obtained in a thin multilayer ceramic capacitor using internal electrodes primarily composed of Ni. In order to ensure preferable reliability of the thin multilayer ceramic capacitor, the content of the above accessory component is preferably in the range of 0.02 to 1 molar part with respect to 100 molar parts of the primary component.

As another example, when the dielectric ceramic of the present invention includes at least one member selected from the group consisting of Mg, N, and Zn as an accessory component, in a thin multilayer ceramic capacitor using internal electrodes primarily composed of Ni, a sufficient insulating resistance can be obtained. In order to ensure preferable reliability of the thin multilayer ceramic capacitor, the content of the above accessory component is preferably in the range of 0.3 to 4 molar parts with respect to 100 molar parts of the primary component.

In addition, when the dielectric ceramic of the present invention includes Si, such as in the form of $SiO_2$, as an accessory component, and firing is performed in a reducing atmosphere, sintering can be easily performed at a lower temperature. The content of this accessory component is appropriately in the range of 0.2 to 5 molar parts with respect to 100 molar parts of the primary component.

Next, a method for manufacturing the dielectric ceramic of the present invention will be described.

First, a method for manufacturing a ceramic starting material for the dielectric ceramic will be described. A (Ba,Ca,Sn)(Ti,Zr)$O_3$ powder as a primary component is obtained by a solid-phase method in which starting materials, such as an oxide powder and a carbonate compound, are mixed together, and the mixture thus obtained is processed by heat-treatment synthesis.

However, since Sn is eventually located in the Ba site as a divalent cationic element in the dielectric ceramic of the present invention, tetravalent Sn which is generally stable must be reduced to divalent Sn. For example, in the heat-treatment synthesis in which the (Ba,Ca,Sn)(Ti,Zr)$O_3$ powder is synthesized, a reducing atmosphere is preferably used as the atmosphere. In particular, the oxygen partial pressure is preferably set to $10^{-10}$ MPa or less.

In addition, the starting material of Sn is preferably mixed together with the starting materials of Ba and Ti in order to reliably solid-solve Sn in the primary component. When the dielectric ceramic of the present invention includes Ca, the starting material of Ca is also preferably mixed together with the starting materials of Ba and Ti as in the case described above.

When $RE_2O_3$ used as a starting material of the rare earth element and the $(Ba,Ca,Sn)(Ti,Zr)O_3$ powder thus obtained are mixed together with, whenever necessary, accessory components, such as MnO, MgO, and $SiO_2$, the ceramic starting material can be obtained. As for these accessory components, the form of its starting material and the type of its compound are not particularly limited.

By the use of the ceramic starting material obtained as described above, a green laminate is obtained by a method similar to a conventional method for manufacturing a multilayer ceramic capacitor. When the green laminate is fired, a reducing atmosphere must be used as the atmosphere in firing. When the oxygen partial pressure in this reducing atmosphere is set to $10^{-12}$ MPa or less, Sn can be reliably located in the Ba site as a divalent cationic element; however, when the content x of Ca is 0.02 or more, the oxygen partial pressure may be set in the range of approximately $10^{-10}$ to $10^{-12}$ MPa.

In addition, the molar ratio m of the total Ba site to the total Ti site is not always required to satisfy a desired range when these starting materials are blended together. For example, the blending of the starting materials of the primary component powder may be performed so that the molar ratio m is slightly smaller, and after the $(Ba,Ca,Sn)(Ti,Zr)O_3$ is synthesized, a stating material of Ba component which is deficient may be added. In this case, the Ba component added as a deficient component is primarily solid-solved in the primary component by firing, and as a result, a desired m value can be obtained.

Subsequently, a multilayer ceramic capacitor is manufactured after the ceramic laminate is obtained by firing, by a method similar to a conventional one.

In addition, dielectric properties, such as the dielectric constant, of the multilayer ceramic capacitor can be evaluated by a method similar to a conventional one. As for the Curie temperature, the change in dielectric constant of the multilayer ceramic capacitor with temperature is measured, and the temperature at which the dielectric constant is maximized is preferably regarded as the Curie temperature. When the maximum point of the change in dielectric constant with temperature is not clear, the change in c/a axis ratio of the crystalline lattice with temperature using x-ray diffraction can be measured, and the boundary temperature between the tetragonal crystal and the cubic crystal may be regarded as the Curie temperature. Alternatively, an exothermic peak generated by the phase transition between the tetragonal crystal and the cubic crystal can be detected by a differential scanning calorimetry, and the temperature at which this exothermic peak is generated may be regarded as the Curie temperature.

EXAMPLES

Hereinafter, examples of the dielectric ceramic of the present invention and the multilayer ceramic capacitor using the same will be described with reference to Experimental Examples 1 to 3.

Experimental Example 1

In this experimental example, the effect of RE on the primary component $(Ba,Ca,Sn)(Ti,Zr)O_3$ was investigated using a multilayer ceramic capacitor including internal electrodes primarily composed of Ni.

First, $BaCo_3$, $TiO_2$, $CaCO_3$, and $SnO_2$ were prepared as starting materials. These starting materials were blended to have a composition represented by the composition formula: $(Ba_{0.85}Ca_{0.10}Sn_{0.05})_{1.01}TiO_3$. This blended powder was mixed and pulverized using a ball mill and was then dried, so that a mixed powder was obtained.

The mixed powder was processed by heat-treatment synthesis at 1,000° C. in a $N_2$—$H_2$ mixed gas atmosphere at an oxygen partial pressure of $10^{-10}$ MPa for 2 hours, so that a powder containing $(Ba_{0.85}Ca_{0.10}Sn_{0.05})_{1.01}TiO_3$ as a primary component was obtained.

Next, $Dy_2O_3$, $MnCO_3$, $MgCO_3$, and $SiO_2$ were blended with the powder containing $(Ba_{0.85}Ca_{0.10}Sn_{0.05})_{1.01}TiO_3$ primary component so as to obtain "a" molar parts of Dy, 0.5 molar parts of Mn, 1.0 molar parts of Mg, and 2.0 molar parts of Si with respect to 100 molar parts of $(Ba_{0.85}Ca_{0.10}Sn_{0.05})_{1.01}TiO_3$, and were then mixed in a solvent. In this step, the content "a" of Dy was changed so as to have the values of Samples of Nos. 1 to 8 shown in Table 1. After the mixing, this powder was dry-pulverized, so that a ceramic starting material was obtained.

A polyvinyl butyral-based binder was added to this ceramic starting material with ethanol functioning as a solvent, followed by performing mixing and pulverizing, so that a slurry was obtained. The slurry was processed by a doctor blade method to form sheets, so that ceramic green sheets having a thickness of 7 μm were obtained.

A conductive paste containing Ni as a primary component was screen-printed on surfaces of the above ceramic green sheets to form conductive paste layers which form internal electrodes. The ceramic green sheets on which the conductive paste layers were formed were laminated to each other so that the side surfaces of the ceramic green sheets at which extended portions of the conductive paste layers were exposed were alternately disposed, so that a green ceramic laminate was obtained.

After being heated at a temperature of 350° C. in a nitrogen atmosphere to burn out the binder, the green ceramic laminate was fired in a $H_2$—$N_2$—$H_2O$ gas atmosphere at an oxygen partial pressure of $10^{-11.5}$ MPa for 2 hours at the firing temperature shown in Table 1, so that a fired ceramic laminate was obtained.

A conductive paste containing a B—Li—Si—Ba—O-based glass frit and Cu as a primary component was applied to two end surfaces of this ceramic laminate and was then fired at 600° C. in a nitrogen atmosphere, so that external electrodes electrically connected to the internal electrodes were formed. Furthermore, a Ni plating layer and a Sn plating layer were formed on each external electrode in order to improve the solderability.

The exterior dimension of the multilayer ceramic capacitor 1 obtained as described above had a length of 2.0 mm, a width of 1.0 mm, and a thickness of 0.5 mm; the thickness of the ceramic layer provided between the internal electrodes was 5 μm; the thickness of a metal layer forming the internal electrode was 0.5 μm; the number of ceramic layers effective for static capacitance was five; and the counter electrode area per one ceramic layer was $1.3 \times 10^{-6}$ m². As described above, evaluation Samples of Nos. 1 to 8 were obtained.

Next, the insulating resistance of each of Samples of Nos. 1 to 8 was measured by applying a direct voltage of 30 kV/mm at 25° C. for 1 minute, and the resistivity ρ was obtained from the insulating resistance. The $\log(\rho/\Omega\cdot cm)$ value is shown in Table 1.

In addition, the dielectric constant $\in r$ was evaluated at 25° C. under an alternating electric field of 0.2 kVrms at 1 KHz, and the value is shown in Table 1. Also, the static capacitance was measured in the range of −55 to 175° C., and the rate of change in static capacitance at 175° C. with respect to that at 25° C. used as a reference is shown as "rate of change in static capacitance (%)" in Table 1. Furthermore, a judgment about whether the X9R characteristics (in which the change in static capacitance in the range of −55 to 175° C. is set within ±15% with respect to a static capacitance at 25° C. which is used as a reference) were satisfied or not is also shown in Table 1.

After the change in static capacitance with temperature was measured in the range of −55 to 200° C., a temperature at which the static capacitance was maximized was regarded as the Curie temperature, and the Curie temperature is shown in Table 1.

Furthermore, the high temperature load life was measured at a temperature of 175° C. and an application electric field of 20 kV/mm, and the mean time to failure (MTTF, unit: h) result is shown in Table 1. In this measurement, failure was present when the resistance was decreased to $10^6$ Ω or less.

The mixed powder was processed by heat-treatment synthesis at 1,000° C. for 2 hours in the air or in a $N_2$—$H_2$ mixed gas atmosphere at an oxygen partial pressure shown in Table 2, so that a powder containing $(Ba_{1-x-y}Ca_xSn_y)_{1.01}TiO_3$ as a primary component was obtained.

Next, $Dy_2O_3$, $MnCO_3$, $MgCO_3$, and $SiO_2$ were blended with the powder containing $(Ba_{1-x-y}Ca_xSn_y)_{1.01}TiO_3$ as a primary component, so as to obtain 3 molar parts of Dy, 0.5 molar parts of Mn, 1.0 molar part of Mg, and 2.0 molar parts of Si with respect to 100 molar parts of $(Ba_{1-x-y}Ca_xSn_y)_{1.01}TiO_3$, and were then mixed in a solvent. After the mixing, this powder was dry-pulverized, so that a ceramic starting material was obtained.

The ceramic starting material was processed by the same steps as those described in Experimental Example 1, and a green laminate having the same structure as that of Experimental Example 1 was obtained.

Sample of No. 12 was not formed into a green laminate but instead was formed into a single plate molded body. That is, a powder was obtained by the steps of wet-mixing the ceramic starting material powder with an acrylic-based organic binder, drying the mixture, and pelletizing the dried mixture,

TABLE 1

| Sample No. | a | Firing temperature (° C.) | Log (ρ/Ω · cm) | ∈r | MTTF (h) | Curie temperature (° C.) | Rate of change in static capacitance (%) | X9R Judgment |
|---|---|---|---|---|---|---|---|---|
| *1 | 0 | 1,050 | 10.5 | 2,000 | 5 | 140 | −28 | x |
| *2 | 0.2 | 1,050 | 12.2 | 2,000 | 40 | 140 | −22 | x |
| 3 | 0.5 | 1,050 | 12.3 | 1,800 | 40 | 140 | −15 | ○ |
| 4 | 2.0 | 1,050 | 12.1 | 1,500 | 50 | 145 | −12 | ○ |
| 5 | 10.0 | 1,050 | 12.1 | 1,200 | 60 | 145 | −12 | ○ |
| 6 | 15.0 | 1,050 | 11.8 | 1,100 | 70 | 145 | −12 | ○ |
| 7 | 20.0 | 1,050 | 12.1 | 1,000 | 80 | 145 | −12 | ○ |
| *8 | 25.0 | 1,050 | 11.8 | 800 | 30 | 145 | −12 | ○ |

Since Sample of No. 1 contained no rare earth element and Sample of No. 2 had a small content of a rare earth element, the static capacitance-temperature characteristics did not satisfy the X9R characteristics.

According to Samples Nos. 3 to 7, the static capacitance satisfied the X9R characteristics, and the ∈r was 1,000 or more because of the Dy function.

Since Sample of No. 8 had an excessive content of Dy, the ∈r value was less than 1,000.

Experimental Example 2

In this experimental example, the influence of the content of Sn and the solid-solution state thereof on the primary effect of the present invention were investigated using a multilayer ceramic capacitor including internal electrodes primarily composed of Ni or a single plate capacitor.

First, $BaCO_3$, $TiO_2$, $CaCO_3$, and $SnO_2$, which were used as starting materials, were blended so that the x and y values of the composition formula: $(Ba_{1-x-y}Ca_xSn_y)_{1.01}TiO_3$ coincided with x and y values of each of Sample Nos. 11 to 24 shown in Table 2. This blended powder was mixed and pulverized using a ball mill and was then dried, so that a mixed powder was obtained.

was press-molded at a pressure of 196 MPa, so that a disc molded body having a diameter of 12 mm and a thickness of 1 mm was obtained.

After being heated at a temperature of 350° C. in a nitrogen atmosphere to burn out the binder, the green ceramic laminates and the disc-shaped sintered body were held in air or in a reducing atmosphere of a $H_2$—$N_2$—$H_2O$ gas for 2 hours at an oxygen partial pressure shown in Table 2 and at a firing temperature shown in Table 2, so that sintered ceramic laminates and a sintered disc-shaped body were obtained.

The ceramic laminates thus obtained were processed by the same steps as those in Experimental Example 1, so that a samples of a multilayer ceramic capacitor having the same structure as that of Experimental Example 1 was obtained.

Ag deposition films were formed on two primary surfaces of the disc sintered body of Sample No. 12 and were used as external electrodes. The exterior dimension of the single plate ceramic capacitor had a diameter of 10 mm and a thickness of 0.8 mm.

The log (ρ/Ω·cm) of resistivity ρ, the ∈r, the rate of change in static capacitance, the judgment result of the X9R characteristics, the MTTF in a high temperature load test, and the Curie temperature were evaluated for Samples of Nos. 11 to 24 thus obtained by the same methods as those in Experimental Example 1. The results are shown in Table 2.

TABLE 2

| Sample No. | x (×10⁻²) | y (×10⁻²) | Oxygen partial pressure in heat-treatment synthesis (MPa) | Oxygen partial pressure in firing (MPa) | Firing temperature (° C.) | Log (ρ/Ω·cm) | ∈r | MTTF (h) | Curie temperature (° C.) | Rate of change in static capacitance (%) | X9R Judgment |
|---|---|---|---|---|---|---|---|---|---|---|---|
| *11 | 10 | 0 | $1 \times 10^{-10.0}$ | $1 \times 10^{-11.5}$ | 1,050 | 12.1 | 1,300 | 30 | 120 | −25 | x |
| *12 | 10 | 2 | In air | In air | 1,050 | 11.3 | 1,200 | — | 105 | −50 | x |
| *13 | 10 | 2 | In air | $1 \times 10^{-11.5}$ | 1,050 | 11.2 | 1,200 | 20 | 105 | −50 | x |
| 14 | 10 | 2 | $1 \times 10^{-10.0}$ | $1 \times 10^{-11.5}$ | 1,050 | 11.8 | 1,300 | 30 | 130 | −15 | ○ |
| 15 | 10 | 7 | $1 \times 10^{-10.0}$ | $1 \times 10^{-11.5}$ | 1,050 | 11.8 | 1,300 | 35 | 145 | −12 | ○ |
| 16 | 10 | 15 | $1 \times 10^{-10.0}$ | $1 \times 10^{-11.5}$ | 1,050 | 11.9 | 1,000 | 35 | 150 | −10 | ○ |
| 17 | 10 | 20 | $1 \times 10^{-10.0}$ | $1 \times 10^{-11.5}$ | 1,050 | 12.1 | 1,000 | 35 | 155 | −8 | ○ |
| *18 | 10 | 30 | $1 \times 10^{-10.0}$ | $1 \times 10^{-11.5}$ | 1,050 | 12.1 | 450 | — | 165 | −3 | ○ |
| 19 | 0 | 5 | $1 \times 10^{-10.0}$ | $1 \times 10^{-11.5}$ | 1,050 | 12.3 | 2,000 | 20 | 130 | −15 | ○ |
| 20 | 2 | 5 | $1 \times 10^{-10.0}$ | $1 \times 10^{-11.5}$ | 1,050 | 12.3 | 1,800 | 25 | 130 | −15 | ○ |
| 21 | 5 | 5 | $1 \times 10^{-10.0}$ | $1 \times 10^{-11.5}$ | 1,050 | 12.1 | 1,500 | 30 | 135 | −15 | ○ |
| 22 | 10 | 5 | $1 \times 10^{-10.0}$ | $1 \times 10^{-11.5}$ | 1,050 | 12.1 | 1,300 | 40 | 140 | −14 | ○ |
| 23 | 20 | 5 | $1 \times 10^{-10.0}$ | $1 \times 10^{-11.5}$ | 1,050 | 11.8 | 1,000 | 40 | 140 | −14 | ○ |
| *24 | 22 | 5 | $1 \times 10^{-10.0}$ | $1 \times 10^{-11.5}$ | 1,050 | 11.8 | 600 | — | 140 | −14 | ○ |

Sample of No. 11 contained no Sn, but contained 3 molar parts of rare earth element Dy with respect to 100 molar parts of the primary component. The X9R characteristics were not satisfied.

Sample of No. 12 was prepared so that the Sn content y was 0.02, and 3 molar parts of rare earth element Dy were present with respect to 100 molar parts of the primary component. The X9R characteristics were not satisfied. Since the Curie temperature was less than 130° C., this indicated that Sn was primarily located in the Ti site. The reason for this is believed that the oxygen partial pressure in heat-treatment synthesis of the primary component powder and that in firing were high.

Sample of No. 13 was prepared so that the Sn content y was 0.02, and 3 molar parts of rare earth element Dy were present with respect to 100 molar parts of the primary component. The X9R characteristics were not satisfied. Since the Curie temperature was less than 130° C., this indicated that Sn was primarily located in the Ti site. The reason for this is believed that the oxygen partial pressure in heat-treatment synthesis of the primary component powder was high.

Samples of Nos. 14 to 17 satisfied the X9R characteristics, and the ∈r was 1,000 or more. Since the Curie temperature was 130° C. or more, it was suggested that Sn was primarily located in the Ba site. However, when the content y of Sn was more than 0.20 as with Sample of No. 18, the ∈r decreased to less than 1,000.

In Samples of Nos. 19 to 23, the amount of Ca was changed; however, as with Samples of Nos. 14 to 17, the X9R characteristics were satisfied, and the ∈r was 1,000 or more. However, when the content of Ca was more than 0.20, as with Sample of No. 24, the ∈r decreased to less than 1,000. In addition, since Sample of No. 19 contained no Ca, the oxygen partial pressure had to be set lower during firing than that of the other samples; however, it did not cause any practical problems.

Experimental Example 3

In this example, the influences of the contents of accessory components and the types thereof on various properties were investigated using multilayer ceramic capacitors which were formed under the same manufacturing condition and which included internal electrodes primarily composed of Ni.

First, as starting materials, $BaCO_3$, $TiO_2$, $CaCO_3$, and $SnO_2$ were prepared. The starting materials, $BaCo_3$, $TiO_2$, $CaCO_3$, and $SnO_2$, were blended so that the m value of $(Ba_{0.85}Ca_{0.10}Sn_{0.05})_m TiO_3$ coincided with an m value of each of Sample Nos. 31 to 71 shown in Table 3. This blended powder was mixed and pulverized using a ball mill and was then dried, so that a mixed powder was obtained.

The mixed powder was processed by heat-treatment synthesis at 1,000° C. in an atmosphere containing a $N_2$—$H_2$ mixed gas at an oxygen partial pressure of $10^{-10}$ MPa for 2 hours, so that a powder containing $(Ba_{0.85}Ca_{0.10}Sn_{0.05})_m TiO_3$ as a primary component was obtained.

To the powder containing $(Ba_{0.85}Ca_{0.10}Sn_{0.05})_m TiO_3$ as a primary component, $Y_2O_3$, $La_2O_3$, $CO_2$, $Pr_6O_{11}$, $Nd_2O_3$, $Sm_2O_3$, $Eu_2O_3$, $Gd_2O_3$, $Tb_2O_3$, $Dy_2O_3$, $Ho_2O_3$, $Er_2O_3$, $Tm_2O_3$, $Yb_2O_3$, $Lu_2O_3$, $MnCO_3$, $V_2O_3$, $MgCO_3$, NiO, ZnO, and $SiO_2$ were blended so that with respect to 100 molar parts of the primary component, a content "a" of a rare earth element RE, a content "b" of at least one member selected from the group consisting of Mn and V, a content "c" of at least one member selected from the group consisting of Mg, Ni, and Zn, and a content "d" of Si on a molar part basis coincided with values of each of Sample Nos. 31 to 71 shown in Table 3, and were then mixed in a solvent. After the mixing, the powder obtained by drying was dry-pulverized, so that a ceramic starting material was obtained.

This ceramic starting material was processed by the same steps as those described in Experimental Example 1, and a green laminate having the same structure as that of Experimental Example 1 was obtained.

After being heated at a temperature of 350° C. in a nitrogen atmosphere to burn out the binder, the green ceramic laminate was fired in a reducing atmosphere of a $H_2$—$N_2$—$H_2O$ gas for 2 hours at an oxygen partial pressure of $10^{-11.5}$ MPa and at the firing temperature shown in Table 3, so that a fired ceramic laminate was obtained.

External electrodes were formed on this ceramic laminate under the same manufacturing conditions as those of Experimental Example 1, so that multilayer ceramic capacitors of Sample Nos. 31 to 71 were obtained.

For Samples of Nos. 31 to 71 thus obtained, the log (ρ/Ω·cm) of resistivity ρ, the ∈r, the rate of change in static capacitance, the judgment result of the X9R characteristics, the MTTF in a high temperature load test, and the Curie temperature were evaluated by the same methods as those in Experimental Example 1. The results are shown in Table 3.

TABLE 3

| Sample No. | m | a | b | c | d | Firing temperature (°C.) | Log (ρ/Ω·cm) | εr | MTTF (h) | Curie temperature (°C.) | Rate of change in static capacitance (%) | X9R Judgment |
|---|---|---|---|---|---|---|---|---|---|---|---|---|
| *31 | 0.980 | Dy 3.0 | Mn 0.50 | Mg 1.0 | 2.0 | 1,050 | 9.7 | 1,600 | — | — | — | — |
| 32 | 0.990 | Dy 3.0 | Mn 0.50 | Mg 1.0 | 2.0 | 1,050 | 12.3 | 1,300 | 40 | 143 | −12 | ○ |
| 33 | 1.000 | Dy 3.0 | Mn 0.50 | Mg 1.0 | 2.0 | 1,050 | 12.1 | 1,300 | 40 | 144 | −12 | ○ |
| 34 | 1.015 | Dy 3.0 | Mn 0.50 | Mg 1.0 | 2.0 | 1,050 | 12.1 | 1,100 | 30 | 140 | −15 | ○ |
| *35 | 1.020 | Dy 3.0 | Mn 0.50 | Mg 1.0 | 2.0 | 1,200 | — | — | — | — | — | — |
| 36 | 1.010 | Dy 3.0 | Mn 0.01 | Mg 1.0 | 2.0 | 1,050 | 6.0 | — | — | — | — | — |
| 37 | 1.010 | Dy 3.0 | Mn 0.02 | Mg 1.0 | 2.0 | 1,050 | 11.6 | 1,200 | 25 | 145 | −12 | ○ |
| 38 | 1.010 | Dy 3.0 | Mn 0.10 | Mg 1.0 | 2.0 | 1,050 | 11.7 | 1,300 | 50 | 145 | −12 | ○ |
| 39 | 1.010 | Dy 3.0 | Mn 0.60 | Mg 1.0 | 2.0 | 1,050 | 11.8 | 1,300 | 50 | 145 | −12 | ○ |
| 40 | 1.010 | Dy 3.0 | Mn 0.80 | Mg 1.0 | 2.0 | 1,050 | 11.6 | 1,300 | 50 | 145 | −12 | ○ |
| 41 | 1.010 | Dy 3.0 | Mn 1.00 | Mg 1.0 | 2.0 | 1,050 | 11.2 | 1,200 | 50 | 145 | −12 | ○ |
| 42 | 1.010 | Dy 3.0 | Mn 1.20 | Mg 1.0 | 2.0 | 1,050 | 10.5 | 1,000 | — | — | — | — |
| 43 | 1.010 | Dy 3.0 | V 0.50 | Mg 1.0 | 2.0 | 1,050 | 11.3 | 1,200 | 50 | 145 | −12 | ○ |
| 44 | 1.010 | Dy 3.0 | Mn 0.50 | Mg 02 | 2.0 | 1,050 | 9.6 | 800 | — | — | — | — |
| 45 | 1.010 | Dy 3.0 | Mn 0.50 | Mg 0.3 | 2.0 | 1,050 | 11.0 | 1,200 | 22 | 145 | −12 | ○ |
| 46 | 1.010 | Dy 3.0 | Mn 0.50 | Mg 3.0 | 2.0 | 1,050 | 11.2 | 1,100 | 23 | 145 | −12 | ○ |
| 47 | 1.010 | Dy 3.0 | Mn 0.50 | Mg 4.0 | 2.0 | 1,050 | 11.0 | 1,000 | 25 | 145 | −12 | ○ |
| 48 | 1.010 | Dy 3.0 | Mn 0.50 | Mg 5.0 | 2.0 | 1,050 | 10.4 | 700 | — | — | — | — |
| 49 | 1.010 | Dy 3.0 | Mn 0.50 | Ni 2.0 | 2.0 | 1,050 | 11.1 | 1,150 | 22 | 145 | −12 | ○ |
| 50 | 1.010 | Dy 3.0 | Mn 0.50 | Zn 2.0 | 2.0 | 1,050 | 11.2 | 1,150 | 23 | 145 | −12 | ○ |
| 51 | 1.010 | Dy 3.0 | Mn 0.50 | Mg 1.0 | 0.1 | 1,200 | — | — | — | — | — | — |
| 52 | 1.010 | Dy 3.0 | Mn 0.50 | Mg 1.0 | 0.2 | 1,150 | 12.3 | 1,000 | 20 | 145 | −12 | ○ |
| 53 | 1.010 | Dy 3.0 | Mn 0.50 | Mg 1.0 | 1.0 | 1,050 | 12.1 | 1,100 | 40 | 145 | −12 | ○ |
| 54 | 1.010 | Dy 3.0 | Mn 0.50 | Mg 1.0 | 5.0 | 1,050 | 11.3 | 1,300 | 30 | 145 | −12 | ○ |
| 55 | 1.010 | Dy 3.0 | Mn 0.50 | Mg 1.0 | 6.0 | 1,050 | 9.8 | 800 | — | — | — | — |
| 56 | 1.010 | Y 3.0 | Mn 0.50 | Mg 1.0 | 2.0 | 1,050 | 12.1 | 1,300 | 30 | 145 | −12 | ○ |
| 57 | 1.010 | La 3.0 | Mn 0.50 | Mg 1.0 | 2.0 | 1,050 | 11.8 | 1,200 | 30 | 143 | −15 | ○ |
| 58 | 1.010 | Ce 3.0 | Mn 0.50 | Mg 1.0 | 2.0 | 1,050 | 11.8 | 1,300 | 35 | 143 | −15 | ○ |
| 59 | 1.010 | Pr 3.0 | Mn 0.50 | Mg 1.0 | 2.0 | 1,050 | 11.9 | 1,200 | 35 | 143 | −15 | ○ |
| 60 | 1.010 | Nd 3.0 | Mn 0.50 | Mg 1.0 | 2.0 | 1,050 | 12.1 | 1,200 | 35 | 144 | −13 | ○ |
| 61 | 1.010 | Sm 3.0 | Mn 0.50 | Mg 1.0 | 2.0 | 1,050 | 12.1 | 1,100 | 40 | 145 | −12 | ○ |
| 62 | 1.010 | Eu 3.0 | Mn 0.50 | Mg 1.0 | 2.0 | 1,050 | 12.2 | 1,300 | 40 | 145 | −12 | ○ |
| 63 | 1.010 | Tb 3.0 | Mn 0.50 | Mg 1.0 | 2.0 | 1,050 | 12.3 | 1,300 | 40 | 145 | −12 | ○ |
| 64 | 1.010 | Ho 3.0 | Mn 0.50 | Mg 1.0 | 2.0 | 1,050 | 12.1 | 1,400 | 40 | 146 | −12 | ○ |
| 65 | 1.010 | Er 3.0 | Mn 0.50 | Mg 1.0 | 2.0 | 1,050 | 12.1 | 1,300 | 30 | 146 | −12 | ○ |
| 66 | 1.010 | Tm 3.0 | Mn 0.50 | Mg 1.0 | 2.0 | 1,050 | 11.8 | 1,200 | 30 | 146 | −12 | ○ |
| 67 | 1.010 | Yb 3.0 | Mn 0.50 | Mg 1.0 | 2.0 | 1,050 | 11.8 | 1,200 | 25 | 146 | −12 | ○ |
| 68 | 1.010 | Lu 3.0 | Mn 0.50 | Mg 1.0 | 2.0 | 1,050 | 11.8 | 1,200 | 25 | 145 | −12 | ○ |
| 69 | 1.010 | Dy 4.2 Er 1.8 | Mn 0.50 | Mg 1.0 | 2.0 | 1,050 | 12.2 | 1,000 | 50 | 145 | −12 | ○ |
| 70 | 1.010 | Dy 3.6 Yb 2.4 | Mn 0.50 | Mg 1.0 | 2.0 | 1,050 | 12.3 | 1,000 | 50 | 144 | −12 | ○ |
| 71 | 1.010 | Y 3.6 Lu 2.4 | Mn 0.50 | Mg 1.0 | 2.0 | 1,050 | 12.2 | 1,000 | 50 | 143 | −12 | ○ |

Samples of Nos. 31 and 35 had a m value of the primary component out of the range of the present invention. In the thin multilayer ceramic capacitor using internal electrodes primarily composed of Ni, sufficient insulating resistance and reliability could not be obtained.

In Samples of Nos. 32 to 34, 37 to 41, 43, 45 to 47, 49, 50, 52 to 54, and 56 to 71, the thin multilayer ceramic capacitor using internal electrodes primarily composed of Ni, sufficient insulating resistance and reliability could be obtained, and the X9R characteristics and the Er were not adversely influenced.

In Samples of Nos. 36 and 42, the content of the at least one of Mn and V was out of the preferable range of the present invention; in Sample of Nos. 44 and 48, the content of the at least one of Mg, Ni, and Zn was out of the preferable range of the present invention; and in Sample of Nos. 51 and 55, the content of Si was out of the preferable range of the present invention. In the thin multilayer ceramic capacitor using internal electrodes primarily composed of Ni according to each of the samples described above, sufficient insulating resistance and reliability could not be obtained. However, the above insulating resistance and reliability were sufficient for practical use for a single plate capacitor or a multilayer ceramic capacitor which does not require firing in a reducing atmosphere.

In Tables 1 to 3 of Experimental Examples 1 to 3, Samples provided with * were samples out of the range of the present invention.

It should be understood that all points of the embodiments and the examples are disclosed by way of example, and that the present invention is not limited thereto. The scope of the present invention is not limited to the above embodiments and examples but is limited only by the claims, and meanings equivalent to the claims and all changes and modifications within the scope of the present invention are intended to be included in the present invention.

INDUSTRIAL APPLICABILITY

Since the dielectric ceramic of the present invention has a high Curie temperature and can be stably used at a high temperature of approximately 175° C., the above dielectric ceramic may be used for a multilayer ceramic capacitor which is preferably used in a high-temperature atmosphere in an automobile application and the like.

The invention claimed is:

1. A dielectric ceramic comprising: a perovskite type compound represented by the composition formula

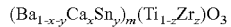

where $0 \leq x \leq 0.20$, $0.02 \leq y \leq 0.20$, $0 \leq z \leq 0.05$, and $0.990 \leq m \leq 1.015$, respectively, as a primary component; and RE as an accessory component, where RE is at least one member selected from the group consisting of Y, La, Ce, Pr, Nd, Sm, Eu, Gd, Tb, Dy, Ho, Er, Tm, Yb, and Lu, wherein 0.5 to 20 molar parts of RE is present with respect to 100 molar parts of the primary component.

2. The dielectric ceramic according to claim 1, having a Curie temperature of 130° C. or more.

3. The dielectric ceramic according to claim 1, further comprising 0.02 to 1 molar part of at least one element selected from the group of Mn and V as an accessory component with respect to 100 molar parts of the primary component.

4. A multilayer ceramic capacitor comprising: a ceramic laminate comprising a plurality of ceramic layers laminated to each other and a plurality of layered internal electrodes formed along interfaces between the ceramic layers; and a plurality of external electrodes electrically connected to the internal electrodes,
wherein the ceramic layers include the dielectric ceramic according to claim 3.

5. The multilayer ceramic capacitor according to claim 4, wherein the internal electrodes comprise Ni as a primary component.

6. The dielectric ceramic according to claim 1, further comprising 0.3 to 4 molar parts of at least one element selected from the group consisting of Mg, Ni, and Zn as an accessory component with respect to 100 molar parts of the primary component.

7. A multilayer ceramic capacitor comprising: a ceramic laminate comprising a plurality of ceramic layers laminated to each other and a plurality of layered internal electrodes formed along interfaces between the ceramic layers; and a plurality of external electrodes electrically connected to the internal electrodes,
wherein the ceramic layers include the dielectric ceramic according to claim 6.

8. The multilayer ceramic capacitor according to claim 7, wherein the internal electrodes comprise Ni as a primary component.

9. The dielectric ceramic according to claim 1, further comprising 0.2 to 5 molar parts of Si as an accessory component with respect to 100 molar parts of the primary component.

10. A multilayer ceramic capacitor comprising: a ceramic laminate comprising a plurality of ceramic layers laminated to each other and a plurality of layered internal electrodes formed along interfaces between the ceramic layers; and a plurality of external electrodes electrically connected to the internal electrodes,
wherein the ceramic layers include the dielectric ceramic according to claim 9.

11. The multilayer ceramic capacitor according to claim 10, wherein the internal electrodes comprise Ni as a primary component.

12. A multilayer ceramic capacitor comprising: a ceramic laminate comprising a plurality of ceramic layers laminated to each other and a plurality of layered internal electrodes formed along interfaces between the ceramic layers; and a plurality of external electrodes electrically connected to the internal electrodes,
wherein the ceramic layers include the dielectric ceramic according to claim 1.

13. The multilayer ceramic capacitor according to claim 12, wherein the internal electrodes comprise Ni as a primary component.

14. A dielectric ceramic comprising: a perovskite type compound represented by the composition formula

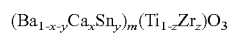

where $0 \leq x \leq 0.20$, $0.02 \leq y \leq 0.20$, $0 \leq z \leq 0.05$, and $0.990 \leq m \leq 1.015$, respectively, as a primary component; and RE as an accessory component, where RE is at least one member selected from the group consisting of Y, La, Ce, Pr, Nd, Sm, Eu, Gd, Tb, Dy, Ho, Er, Tm, Yb, and Lu, wherein 0.5 to 20 molar parts of RE is present with respect to 100 molar parts of the primary component, and wherein $0.02 \leq x \leq 0.20$.

15. The dielectric ceramic according to claim 14, having a Curie temperature of 130° C. or more.

16. The dielectric ceramic according to claim 15, further comprising 0.02 to 1 molar part of at least one element selected from the group of Mn and V as an accessory component with respect to 100 molar parts of the primary component.

17. The dielectric ceramic according to claim 16, further comprising 0.3 to 4 molar parts of at least one element selected from the group consisting of Mg, Ni, and Zn as an accessory component with respect to 100 molar parts of the primary component.

18. The dielectric ceramic according to claim 17, further comprising 0.2 to 5 molar parts of Si as an accessory component with respect to 100 molar parts of the primary component.

19. A multilayer ceramic capacitor comprising: a ceramic laminate comprising a plurality of ceramic layers laminated to each other and a plurality of layered internal electrodes formed along interfaces between the ceramic layers; and a plurality of external electrodes electrically connected to the internal electrodes,
wherein the ceramic layers include the dielectric ceramic according to claim 18.

20. The multilayer ceramic capacitor according to claim 19, wherein the internal electrodes comprise Ni as a primary component.

* * * * *